Feb. 10, 1953   R. M. PAGE   2,628,348
INSTRUMENT FOR MEASURING THE RATIO OF PULSE
WIDTH TO PULSE RECURRENCE PERIOD OF
RECURRENT PULSE SIGNALS
Filed Sept. 26, 1942
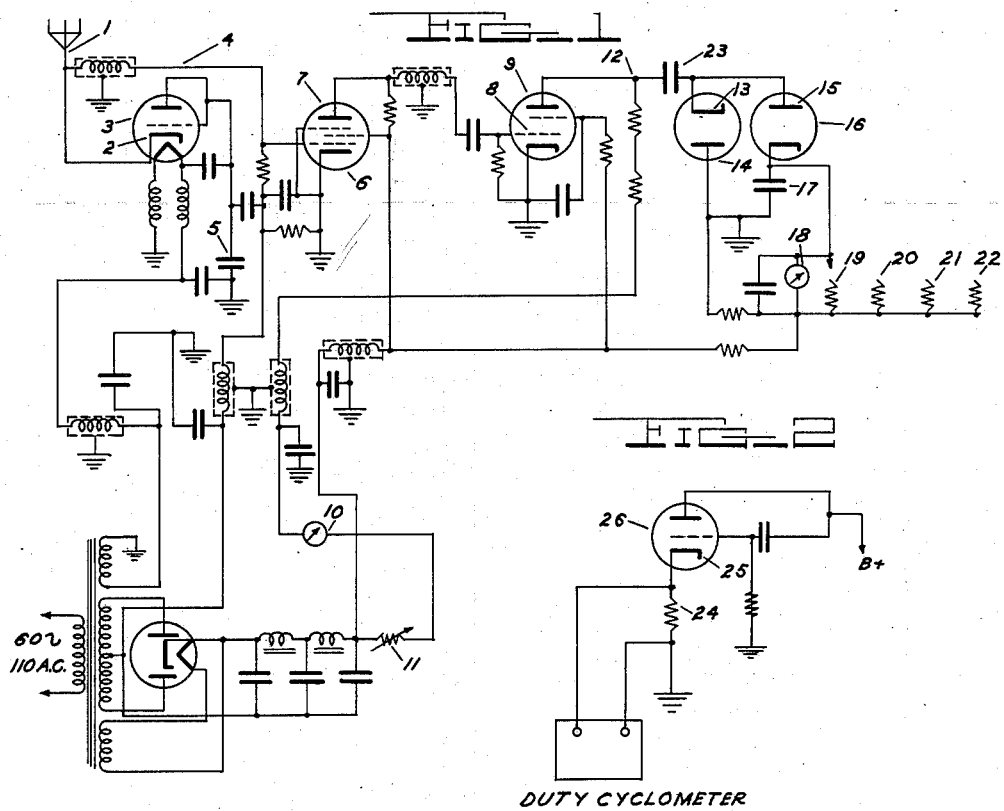
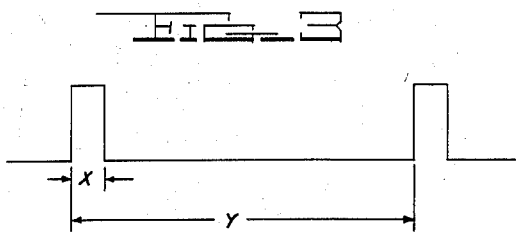
DUTY CYCLOMETER
Inventor
Robert M. Page
By
Attorney Patented Feb. 10, 1953

2,628,348

UNITED STATES PATENT OFFICE 2,628,348

INSTRUMENT FOR MEASURING THE RATIO OF PULSE WIDTH TO PULSE RECURRENCE PERIOD OF RECURRENT PULSE SIGNALS

Robert M. Page, Washington, D. C.

Application September 26, 1942, Serial No. 459,801

9 Claims. (Cl. 343—5)

(Granted under Title 35, U. S. Code (1952), sec. 266)

This invention relates broadly to a new and useful instrument for measuring periodic voltages such as those occurring in the duty cycle of a radio echo transmitter.

The present day transmitter which is applicable to radio echo apparatus is generally characterized in the ability to produce a series of short duration pulses each separated one from the other by a comparatively long interval of time. The length or time duration of these pulses is a factor of prime importance in determining the ability of the radio echo gear to detect obstacles at close ranges, since a radio wave travels, theoretically, at a speed of 328 yards per microsecond or covers a range of 164 yards per microsecond. Thus a pulse of say 3 microseconds duration could not be used to detect an obstacle less than 492 yards away. The pulse duration also governs the available amount of peak transmitted power for a given average power, namely, the peak power is inversely proportional to the pulse time length. Obviously, it is extremely important that the engineers know the pulse length in order to determine certain vital characteristics of the transmitter.

The applicant's novel device provides a means for measuring the ratio of pulse length to the time required for pulse recurrence and expresses the result on a visual indicator which is calibrated in percentages. Therefore, by utilizing the applicant's device with a few simple calculations, the pulse length can be quickly determined. The indicator usually has a plurality of scales, for indicating the ratio of pulse duration to pulse recurrence period in percentages. In a typical example these scales extend in range from 0 to 10 percent.

It is therefore an object of this invention to provide a means for producing a continuous indication of the absolute operating time of a radio echo transmitter.

It is another object of this invention to provide a means for facilitating the time length measurement of a radio frequency pulse.

It is another object of this invention to provide a means for measuring the inner range limit of a radio echo transmitter.

It is another object of this invention to provide a means for determining the peak power of a radio pulse transmitter.

It is another object of this invention to provide a means for measuring the average amount of energy that is periodically stored in a circuit.

Other objects will become apparent upon a careful consideration of the following description when taken together with the accompanying drawings, in which:

Fig. 1 is a schematic diagram embodying the principles of the present invention;

Fig. 2 is a variation in the method of coupling the present device to the pulse oscillator, and Fig. 3 is a diagrammatical representation of the pulse length to pulse repetition period.

A complete understanding of the present invention may be had from the following description taken together with the figures of this invention.

The present device includes an antenna, a detector and a pair of cascaded amplifiers connected to the antenna through the detector in such a manner that the negative half cycles of an alternating voltage induced in said antenna are shunted to ground while the positive half-cycles are impressed on the input of said cascade amplifiers. The positive output of said amplifiers is impressed upon the anode of a diode which has a capacitance connected in its cathode circuit. Consequently, if the antenna is coupled to the pulse oscillator of a transmitter a voltage similar to the pulse output of the oscillator will be induced therein; the positive half-cycles of which will be impressed upon the cascaded amplifiers to cause a positive pulse to be delivered to the anode of said diode and charge the capacitance according to the pulse length and rate of recurrence. The average charge developed across this capacitance will be an indication of the duty cycle and is measured by an ammeter.

The antenna 1 is inductively coupled to the field of the oscillator of the transmitter and develops a radio frequency voltage of the same wave form and envelope as emitted by the transmitter. The resistance 11 connecting the plate of tube 9 to the B supply is varied until a predetermined amount of plate current is flowing in amplifier 9 as will be indicated by the deflection of meter 10. The antenna coupling is then adjusted until meter 13 shows maximum deflection which indicates that the best possible coupling of the antenna to the oscillator has been reached. The negative half-cycles of the radio frequency voltage developed by antenna 1 will drive the cathode 2 of detector tube 3 of demodulator 4 negative, thereby causing the detector tube to conduct and offer a low radio frequency impedance to ground through condenser 5 for these half-cycles. The positive half-cycles of this voltage will, however, be shunted to the control grid 6 of tube 7 which is biased for class B operation. These half-cycles occur so rapidly that the input to tube 7 will appear like a rectified square-topped pulse. The positive voltage applied to the first tube 7 will render this tube conducting to thereby produce a negative voltage pulse at its plate. This negative pulse is applied to the control grid of tube 9, which, as shown in the drawing is arranged to operate at zero bias potential, and is therefore strongly conducting. If the coupling between antenna 1 and the oscillator is properly adjusted the negative input pulse to tube 9 will be sufficiently intense to render tube 9 nonconducting. At this instant the current normally passing through tube 9 is diverted to diode 16 so that the voltage at point 12 rises in a positive sense, and is applied through condenser 23 to the anode 15 of diode 16. As point 12 rises positively, diode 16 is rendered conducting and condensers 17 and 23 charge in the usual exponential manner. The rate at which these condensers charge depends upon the current normally flowing through meter 10 and is adjustable by means of resistance 11. Thus the peak charge which may accumulate on condenser 17 during the duration of a pulse, and for a given setting of the variable resistance 11, is directly proportional to the duration of the pulse. The average charge, however, which accumulates on condenser 17 for a given setting of variable resistance 11 is, directly proportional to the ratio of pulse duration $x$, and pulse repetition period $y$, and is measured by milliameter 18. In other words the average charge which accumulates on condenser 17 is a measure of the duty cycle of the pulse oscillator.

After the coupling of the antenna 1 to the pulse oscillator has been set so that the negative pulse signal applied to tube 9 is sufficient to render the same non-conducting, the deflection of meter 18 should be steady and at a maximum. However, a variation in the deflection thereof may sometimes occur. This action is indicative that the pulse is not a true square topped pulse.

A multiplicity of resistors 19, 20, 21 and 22 are connected in shunt with the meter 18 so as to provide a measure of selectivity in choosing the meter range scales. A second diode 14 is connected in shunt with diode 15 for the purpose of discharging the condenser 23 during the interval between successive pulses.

From the foregoing it is apparent that condenser 17 serves as a storage capacitor across which is accumulated a voltage which is directly proportional to the duration of the input pulse developed at antenna 1 and inversely proportional to the time interval between successive pulses. Also from the foregoing it will be apparent that the charge path for condenser 23 is the same as that for condenser 17 while the discharge path for condenser 23 is through diode 14 to ground and the discharge path for condenser 17 is through meter 18 and the associated shunt resistor.

A duty cyclometer of this class has been successfully used on pulse oscillators having frequencies ranging from 100–600 megacycles and a pulse recurrence rate of 60–640 pulses per second. This cyclometer can even be used to give an approximation on the date of transmitter tube expiration and also as a means of detecting erratic pulsing.

Great care must be taken in the shielding of this apparatus since it is operating in a highly concentrated radio frequency field. In some cases where the oscillator is so located that it is difficult to obtain a good radio frequency coupling, a direct coupling may be used. A shielded line will then suffice for the coupling means and thus greatly reduce the need for elaborate shielding of the cyclometer itself. A typical method of direct coupling is shown in Fig. 2. A low resistance 24, say in the order of 10 ohms, is inserted in the cathode of the oscillator 26. The cyclometer is tied across the resistance which produces a voltage drop of a wave form that corresponds to that of the pulse when plate current is flowing in the oscillator. Comparative tests using both direct and inductive coupling have shown that there is little or no difference in the results obtained.

An oscillator delivering pulses at a rate and length similar to that of Fig. 3 will have a duty cycle equal to $x/y$ as measured by the present duty cyclometer.

It must be understood that even though I have shown and described a preferred embodiment of this invention I am fully aware of the many modifications possible thereof.

The invention described herein may be manufactured and used by or/for the Government of the United States of America for governmental purposes without the payment of any royalties thereon or therefor.

I claim:

1. A device for measuring the ratio of pulse duration to pulse recurrence period of the output from a pulse oscillator comprising, means for receiving the output pulse signal from said oscillator, demodulator means for rectifying said received pulse signal to derive an equal duration direct current output pulse therefrom, amplifying means including a substantially fixed direct current source coupled to the output of said demodulator means, a capacitive storage element, means coupling said capacitive storage element to said substantially fixed direct current source in response to and for the duration of the input signal to said amplifying means to charge said storage element at a substantially fixed rate over the duration of each input pulse to said amplifying means, and for decoupling said storage element from said substantially fixed direct current source in the interval between successive input pulse signals to said amplifying means, means to discharge said storage element at a predetermined rate during the interval between successive pulse signals, and means for indicating the value of the average charge stored on said capacitive storage element.

2. A device for measuring the ratio of pulse duration to pulse recurrence period of the output from a pulse oscillator comprising, demodulator means for rectifying the pulse output signal from said oscillator to derive an equal duration direct current output pulse therefrom, amplifying means having input and output stages with the input stage coupled to the output of said demodulator means, said output stage including a substantially fixed direct current source adjusted to normally pass a predetermined amount of current, a capacitive energy storage element, means coupling said storage element to said direct current source in response to and for the duration of the input signals to said amplifying means to charge said storage element at a substantially fixed rate over the duration of each input pulse to said amplifying means, and for decoupling said storage element from said direct current source in the interval between successive input pulse signals to said amplifying means, discharge means coupled to said storage element for discharging the same at a predetermined rate during the interval between successive input pulse signals to said amplifying means, and means for indicating the value of average charge stored on said capacitive storage element.

3. In a device of the class described, an antenna for receiving radio frequency pulses, a means for dissipating the negative half-cycles of said radio frequency pulses induced in said antenna, a pair of amplifier tubes having input and output electrodes connected in cascade, the input amplifier of said cascaded amplifiers being so biased as to amplify only the positive swings of its input electrode, the output amplifier of said cascaded amplifiers being so biased as to be normally saturated, means including the first named means for impressing the positive half-cycles of said radio frequency pulses on the input of said cascade amplifiers, a capacitance, means coupling the output of said cascaded amplifiers to said capacitance to charge the same at a predetermined rate during the duration of the input pulses and to discharge the same at a predetermined rate during the interval between input pulses, and a means for measuring the average charge on said capacitance.

4. In a device of the class described, an antenna for receiving radio frequency pulses, a detector tube connected to the output of said antenna for clipping the negative half-cycles of said radio frequency pulses, a pair of amplifier tubes having input and output electrodes connected in cascade, the input amplifier of said cascaded amplifiers being so biased as to amplify only the positive swings of its input electrode, the output amplifier of said cascaded amplifiers being so biased as to be normally saturated, means including said detector tube for impressing only the positive half-cycles of said radio frequency pulses on the input of said cascaded amplifiers, a capacitance, means coupling the output of said cascaded amplifiers to said capacitance to charge the same at a predetermined rate during the duration of the input pulses and to discharge the same at a predetermined rate during the interval between input pulses, and a means for measuring the average charge on said capacitance.

5. A device as set forth in claim 4, wherein said means for charging and discharging said capacitance comprises a pair of diodes connected in shunt, with the plate of one of said diodes connected to ground, and the cathode of the other of said diodes connected to ground through said capacitance.

6. In a device of the class described, an antenna for receiving radio frequency pulses, a detector tube connected to the output of said antenna for clipping the negative half-cycles of said radio frequency pulses, a pair of amplifier tubes having input and output electrodes connected in cascade, the input amplifier of said cascaded amplifiers being so biased as to amplify only the positive swings of its input electrode, the output amplifier of said cascaded amplifiers being so biased as to be normally saturated, means including said detector tube for impressing only the positive half-cycles on the input of said cascaded amplifiers, a pair of diodes in shunt connected to the output of said cascaded amplifiers, a capacitance, the anode of one of said diodes being connected to ground and the cathode of the other of said diodes being also connected to ground through said capacitance, and an ammeter connected across said capacitance for measuring the average charge thereon.

7. In a device for determining the operational properties of a radio frequency pulse transmitter, the combination of; a rectifier coupled to the transmitter to rectify the pulse signal output from said transmitter and to derive an equal duration direct current output pulse therefrom, an energy storage element, a charging circuit including a substantially fixed direct current source, coupling means fed by the output of said rectifier and operative in response to the output of said rectifier to couple said storage element to said substantially fixed direct current source over the duration of the output pulse from said rectifier to store energy in said element during the output from said rectifier at a predetermined rate, discharge means coupled to said element for discharging the energy stored therein also at a predetermined rate, and an indicator coupled to said storage element for indicating the average charge developed thereacross.

8. In a device for determining the operational properties of a pulse oscillator, the combination of; an energy storing element, a charging circuit including a substantially fixed direct current source, means coupling said storage element to said substantially fixed direct current source in response to and for the duration of each output pulse from the oscillator to charge the energy storing element at a fixed rate in response to and for the duration of each output pulse from the oscillator, discharge means coupled to said element for discharging the energy stored therein also at a predetermined rate, and an indicator coupled to said storage element for indicating the average charge developed thereacross.

9. A device for measuring the ratio of pulse duration to pulse recurrence period of the output from a recurrent pulse source comprising, an energy storage element, a charging circuit including a substantially fixed direct current source, coupling means fed by the output of said pulse source and responsive to the output from said pulse source to couple said storage element to said substantially fixed direct current source for the duration of the output from said pulse source to thereby charge said storage element at a substantially fixed rate over the duration of each output pulse from said pulse source, discharge means coupled to said storage element operative to discharge said storage element at a predetermined rate, and means coupled to said storage element for measuring the average charge developed thereacross.

ROBERT M. PAGE.

REFERENCES CITED

The following references are of record in the file of this patent:

UNITED STATES PATENTS

| Number | Name | Date |
|---|---|---|
| 2,009,459 | Turner | July 30, 1935 |
| 2,055,883 | Terry | Sept. 29, 1936 |
| 2,061,734 | Kell | Nov. 24, 1936 |
| 2,144,843 | Hearn | Jan. 24, 1939 |
| 2,218,642 | Hathaway | Oct. 22, 1940 |
| 2,228,367 | Sanders, Jr. | Jan. 14, 1941 |
| 2,301,195 | Bradford | Nov. 10, 1942 |
| 2,307,316 | Wolff | Jan. 5, 1943 |
| 2,309,560 | Welty | Jan. 26, 1943 |
| 2,313,666 | Peterson | Mar. 9, 1943 |
| 2,333,688 | Shepard | Nov. 9, 1943 |
| 2,336,929 | Doyle | Dec. 14, 1943 |
| 2,346,093 | Tolson | Apr. 4, 1944 |
| 2,404,527 | Potapenko | July 23, 1946 |
| 2,407,323 | O'Brien | Sept. 10, 1946 |

FOREIGN PATENTS

| Number | Country | Date |
|---|---|---|
| 469,417 | Great Britain | July 26, 1937 |